United States Patent
Robertson

(10) Patent No.: US 11,313,146 B2
(45) Date of Patent: Apr. 26, 2022

(54) METHOD AND PRODUCT TO PREVENT FLOODING OF A MOTOR VEHICLE IN HIGH WATER

(71) Applicant: Ray D. Robertson, Marshall, TX (US)

(72) Inventor: Ray D. Robertson, Marshall, TX (US)

(73) Assignee: Ray D. Robertson, Marshall, TX (US)

( * ) Notice: Subject to any disclaimer, the term of this patent is extended or adjusted under 35 U.S.C. 154(b) by 0 days.

(21) Appl. No.: 16/686,602

(22) Filed: Nov. 18, 2019

(65) Prior Publication Data

US 2021/0148132 A1 May 20, 2021

(51) Int. Cl.
  *E04H 9/14* (2006.01)
  *E04H 15/20* (2006.01)
  *B60J 11/04* (2006.01)
  *E04B 1/19* (2006.01)

(52) U.S. Cl.
  CPC .......... *E04H 9/145* (2013.01); *E04H 15/20* (2013.01); *B60J 11/04* (2013.01); *E04B 2001/1939* (2013.01); *E04H 2015/201* (2013.01)

(58) Field of Classification Search
  CPC ... E04H 9/145; E04H 15/20; E04H 2015/201; B60J 11/04; E04B 2001/1939
  See application file for complete search history.

(56) References Cited

U.S. PATENT DOCUMENTS

| | | | | |
|---|---|---|---|---|
| 4,918,877 A | * | 4/1990 | Dutka | E04H 15/20 285/239 |
| 5,954,200 A | * | 9/1999 | Allain | B60J 11/00 206/335 |
| 6,282,843 B1 | * | 9/2001 | Shibaike | E04H 15/20 52/2.11 |
| 6,517,141 B1 | * | 2/2003 | Su | B60J 11/00 150/166 |
| 10,926,615 B2 | * | 2/2021 | Adams | B60J 11/04 |
| 11,230,175 B2 | * | 1/2022 | Dawson | B60J 11/04 |
| 2003/0098054 A1 | * | 5/2003 | Yang | E04H 15/20 135/124 |
| 2008/0187255 A1 | * | 8/2008 | Griffin | E04H 6/04 383/93 |
| 2010/0083586 A1 | * | 4/2010 | Page | E04H 15/22 52/2.11 |
| 2015/0017338 A1 | * | 1/2015 | Wiliams | B05B 16/80 427/421.1 |
| 2015/0017897 A1 | * | 1/2015 | Wiliams | B05B 16/80 454/51 |
| 2015/0036949 A1 | * | 2/2015 | Lasagna | E04H 9/145 383/14 |

(Continued)

FOREIGN PATENT DOCUMENTS

GB 2577304 A * 3/2020

*Primary Examiner* — Rodney Mintz
(74) *Attorney, Agent, or Firm* — Darcell Walker

(57) ABSTRACT

An inflatable housing structure forms an airtight enclosure for a motor vehicle positioned inside the housing. This airtight enclosure prevents water from entering and thereby prevents the water from accessing the vehicle. The housing comprises sides, a top and floor made of flexible waterproof material such as plastic or vinyl. Air tubes attached to the surfaces of the housing, inflate to form and sustain a housing structure. The air tubes for supporting the housing structure can be outside or inside the structure when formed. These air tubes can also be embedded into the surfaces of the housing.

12 Claims, 10 Drawing Sheets

(56) References Cited

U.S. PATENT DOCUMENTS

| | | | | |
|---|---|---|---|---|
| 2016/0368357 A1* | 12/2016 | Lerner | | B65D 33/28 |
| 2017/0156961 A1* | 6/2017 | Patel | | A61G 10/005 |
| 2018/0245362 A1* | 8/2018 | Wibben | | E04B 1/941 |
| 2018/0334795 A1* | 11/2018 | Park | | E04B 1/344 |
| 2019/0100287 A1* | 4/2019 | Fisher | | B60J 11/04 |
| 2019/0202275 A1* | 7/2019 | Dawson | | B60J 11/04 |
| 2019/0337370 A1* | 11/2019 | Adams | | B60J 11/04 |
| 2019/0337371 A1* | 11/2019 | Rother, Sr. | | B60J 11/04 |
| 2020/0079199 A1* | 3/2020 | Blueford | | B60J 11/04 |
| 2020/0181937 A1* | 6/2020 | Gendel | | E02D 3/02 |

\* cited by examiner

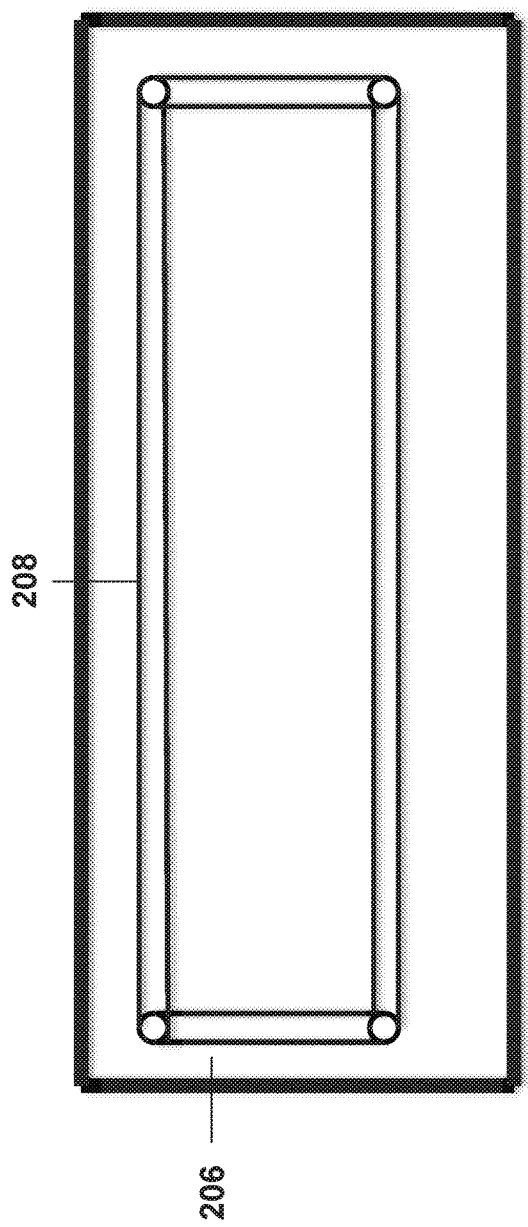
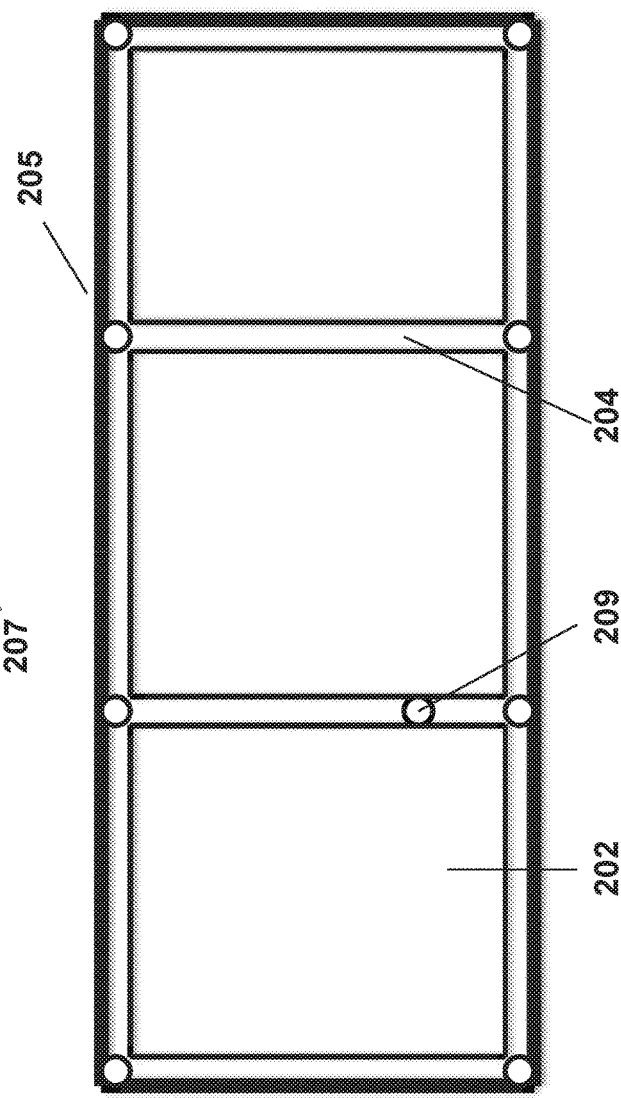

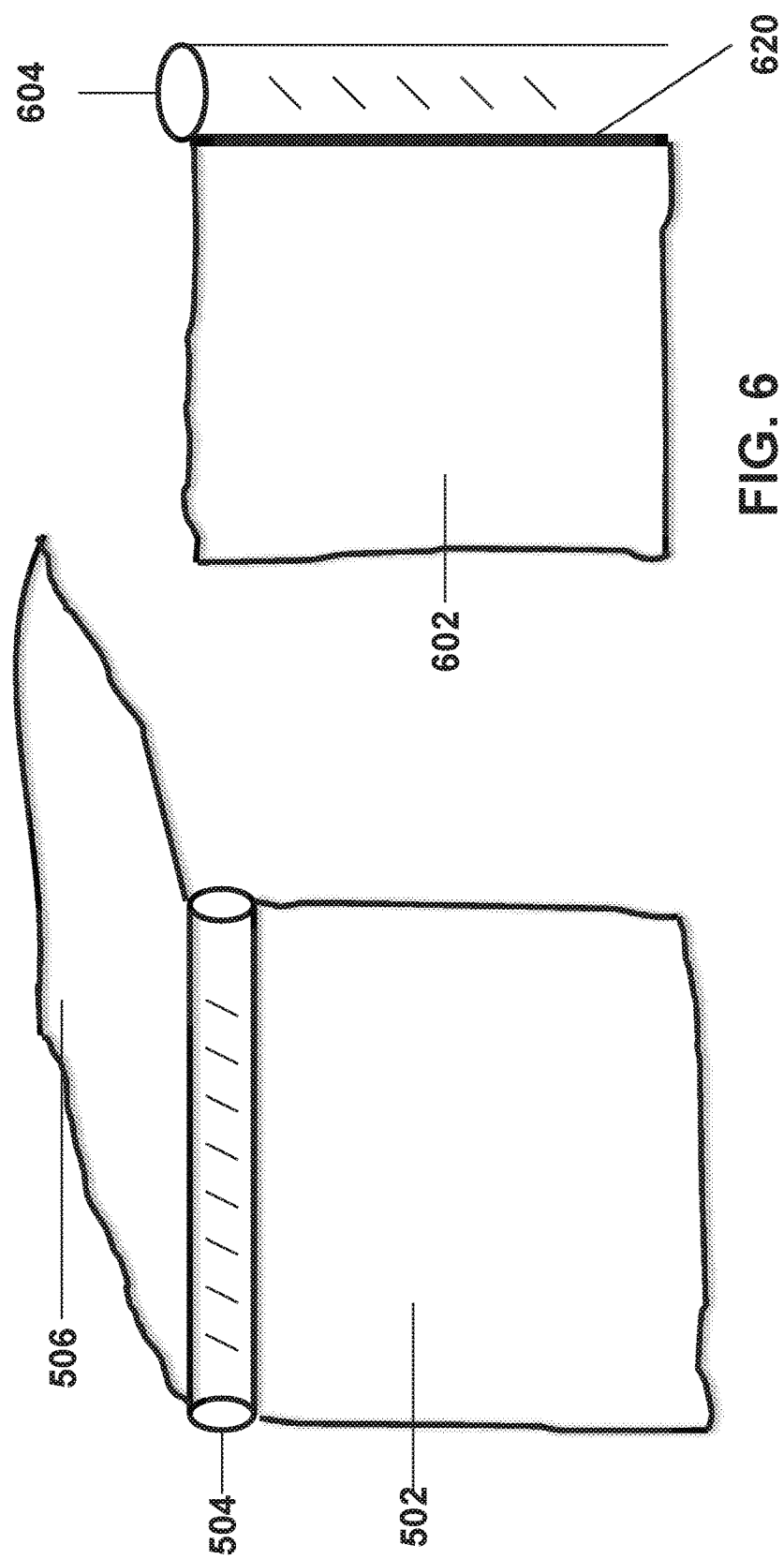
FIG. 5
FIG. 6
FIG. 7

METHOD AND PRODUCT TO PREVENT FLOODING OF A MOTOR VEHICLE IN HIGH WATER

FIELD OF THE INVENTION

This invention relates to a system to prevent a motor vehicle from flooding by external high water. In particular, this invention relates to a system that covers and vehicle and encloses the motor vehicle in a watertight enclosure to prevent water from penetrating the enclosure and thereby keeping water from entering and flooding the motor vehicle.

BACKGROUND

A flood is an overflow of water that submerges land that is usually dry. Flooding may occur as an overflow of water from water bodies, such as a river, lake or ocean, in which the water overtops or breaks a restraint or levee resulting in some of that water escaping. In many places floods occur due to an accumulation of rainwater on saturated ground. These floods can be the result of a substantial amount of rainfall in one geographic area in a short period of time. Flash flooding is a type of caused by heavy rain falling in a short amount of time.

The primary effects of flooding include loss of human and animal life and damage to buildings and other structures, including bridges, sewerage systems, roadways, and canals. Flooding can also cause substantial damage to personal property such as motor vehicles. Flooding is different from other weather related damage to the point that many places have special insurance specifically for flood damage caused by weather.

Motor vehicles damaged from floodwaters create several issues for the vehicle owner. However, a vehicle damaged from floodwaters can impact other people and entities as well. Initially, flood damage can cause a vehicle to lose total functionality and have to be totaled out by an insurer. Second, many flooded car are repaired put up for sale in different states from where the flooding occurred. Selling vehicles previously damaged from floods cars has become a major concern for consumers.

The protection of motor vehicles has been concern for vehicles owners over the years. People have made efforts to protect their vehicles against many forms of damage. Some owners use basic car covers to shield their vehicle from weather such as the heat of the sun. Others use protection products to protect their vehicles from damage resulting from objects striking the vehicle.

Some products currently used to protect motor vehicles include the basic flexible cloth like, nylon, or vinyl car cover. The owner would take a cover and spread it over the exterior of the car. Although this basic cover does provide some form of protection, it is insufficient to protect the vehicle from damage when an object strikes the vehicle. Objects that could strike a vehicle could be falling objects from trees, hail damage from the weather, other flying objects from different sources or just the classic ding from another vehicle closely parked to the covered vehicle.

In addition to the standard car cover, there are some other products that can provide protection to motor vehicles from flying objects that could strike the vehicle and cause damage. These products incorporate some form inflatable structure to enclose the vehicle. Some the industry names for these products in CarCapsule and Car Bubble. These names are an accurate description of the products. As mentioned, these products provide a structure inflated by air. A vehicle is positioned in the structure after air has inflated the structure. The air-inflated walls and top of the structure form a cushion against flying objects. In addition to protecting the vehicle from damage due to objects striking the vehicle, some classic car owners and people who restore cars use the inflatable vehicle enclosure to shield the vehicle from exposure to weather and thereby preserve to look or appearance of the vehicle.

These products do accomplish the objective of their creation. These products were designed to prevent certain damage to motor vehicle caused by physical objects striking the vehicles. However, protecting the vehicle from potential damage from water flooding the vehicle does not appear an objective of these products. Similar to damage from flying objects or falling objects striking one's vehicle, water can substantially damage a person's vehicle. There remains a need for a product that can protect a motor vehicle that is not a situation where it could be surrounded by high water or flood water resulting from severe weather or other unforeseen incident.

SUMMARY

This invention is a vehicle enclosure structure for the purpose of preventing water from penetrating inside structure to a vehicle housed inside. This invention comprises a structure with sides, a top section, a bottom or floor section, a forward section and a back end section. The back end section covers the opening through which a vehicle would enter and exit the structure. The sides and sections of the structure comprise a flexible waterproof material such as vinyl or plastic. Attached to or embedded in the sides and top section of the structure are air tubes or channels. When these are tubes are inflated, they form the support structure for the sides, top, front and back sections of the structure. These inflated air tubes function in manner similar to beams in a building structure. The floor section of the structure can comprise a material that is more durable than the material in the other sections of the structure. The sides and other sections are attached through a process that forms an airtight seal between the sections. In one embodiment, the attached sides and sections can be a permanent attachment. In the alternative, the sides and sections can be detachable and reattach able. In this latter embodiment, an individual would need to assemble the sides and sections of the structure by attaching the edges of the sides and sections. This attachment process can be before or after the inflating of the air tubes that will enable the structure to take form. Once air has inflated the tubes and the structure has taken shape, one can drive or position the motor vehicle in the structure. At this point, the back end section folds over the opening at the rear of the structure and is attached to the sides and top of the structure with airtight and waterproof seals. Once the back end section is attached to the other portions of the structure, the enclosed vehicle is shielded from the penetration of water and thereby protected from vehicle flooding.

DESCRIPTION OF THE DRAWINGS

FIG. 2 is a view of the top surface of the structure of the present invention showing the inflatable air tubes.

FIG. 3 is a view of the side surface of the structure of the present invention showing the inflatable air tubes.

FIG. 5 is a view of the attachment of the side surface and top surface with an air tube.

FIG. 6 is a view of the attachment of the side surface and air tube of the present invention.

FIG. 7 is a side view of the attachment of the edges of the sides and top surface of the present invention.

DETAILED DESCRIPTION OF THE INVENTION

The present invention is a product designed to prevent high water from flooding a motor vehicle when the vehicle is in a parked position and location. The general concept of this invention is to enclose the lower portion of the vehicle in a waterproof and watertight material to prevent the penetration of water into the vehicle. As the floodwater subsides, the owner of the vehicle can remove the waterproof material from around the vehicle and store it until the need arises to protect the vehicle.

Figure 1:
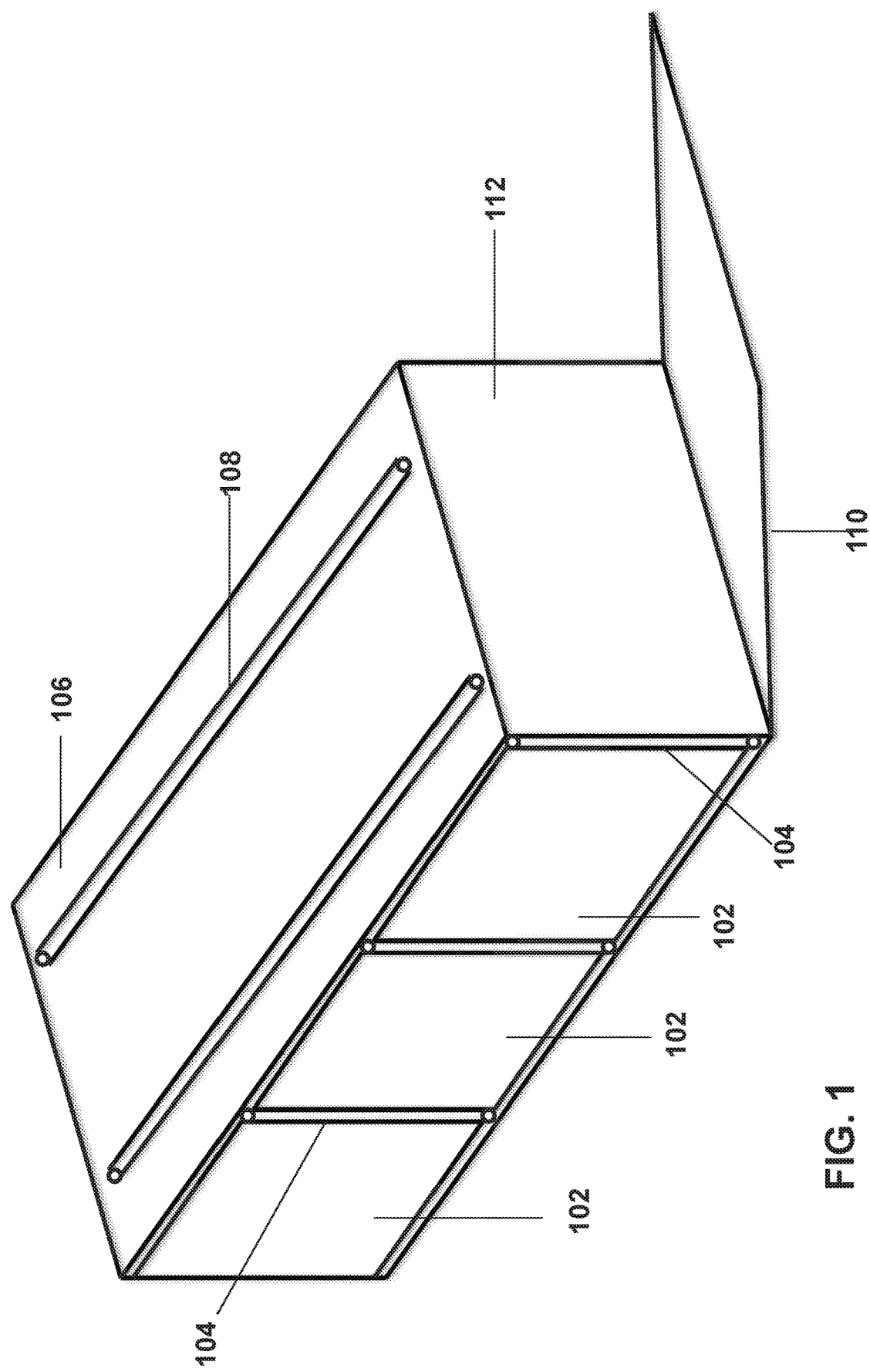
FIG. 1 is a view of the structure of the present invention with the air tubes inflated.

In one embodiment of this invention, FIG. 1 shows a basic structure of the vehicle housing in this invention. The invention can have a generally rectangular shape with sides 102, a top section 106 and a front entrance section 110 through which one can drive the vehicle into the structure. This product uses air to inflate tubes in the side sections and top section to create the physical shape of the housing. Tubes 104 attached to the side sections 102 inflate to create the physical support and structural integrity for the sides to hold them in place. Also tubes 108 inflate to create the support and physical integrity for the top section 106. Once air fills the tubes 104 and 108, the air pressure enables the tubes to maintain their shape and structural support for the housing. The tubes become like and serve a similar purpose to beams for a house or other building structure. The material 102 and 106 that forms the sidewalls and the top section can be a flexible and waterproof material such as vinyl or thick plastic. The important characteristic is that the material be able to prevent water from penetrating into the housing and the vehicle. This structure has a back section and a front section. As shown, the front section 110 covers the opening 112 once the vehicle is inside the housing. Once the vehicle is inside the housing one can seal the housing at the front cover in a variety of common means.

FIG. 2 shows a concept view of the top section 206 of the housing in the present invention. As shown, the air tubes are attached to the surface of the housing material. In addition, the surface has edges 207 that attached to the edges 205 of the side sections. FIG. 3 shows the side sections 202 with a system of air tubes 204 attached to the side section. This system of air tubes can connect several air tubes to form the support structure. In another configuration the air tubes can separate tubes attached to the side surface. To inflate the tubes with air and to deflate the air tubes one or more inlet connectors 209 provide a means to connect an air source to the tubes for tube inflation. The same inlet connectors can provide a means to connect a deflation device to remove the air from the tubes as desired. The sidewall edges 205 will attach to the edges 207 of the top section 206 and create a watertight seal to further form the housing.

Figure 4A:
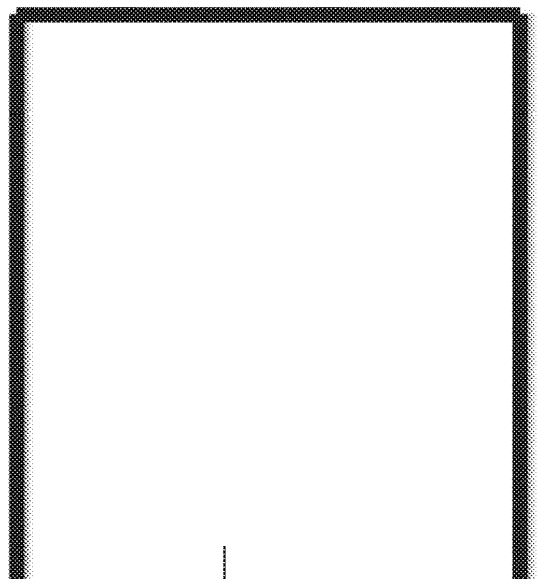
FIG. 4a is a view of the back section of the present invention.
Figure 4B:
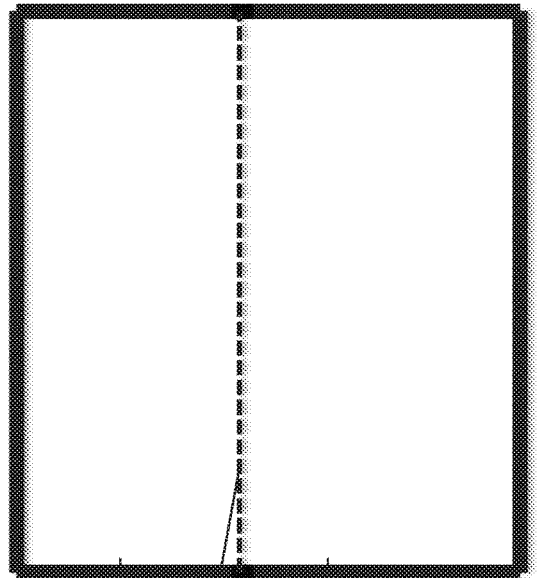
FIG. 4b is a view of the front folding cover section of the present invention.
Figure 4C:
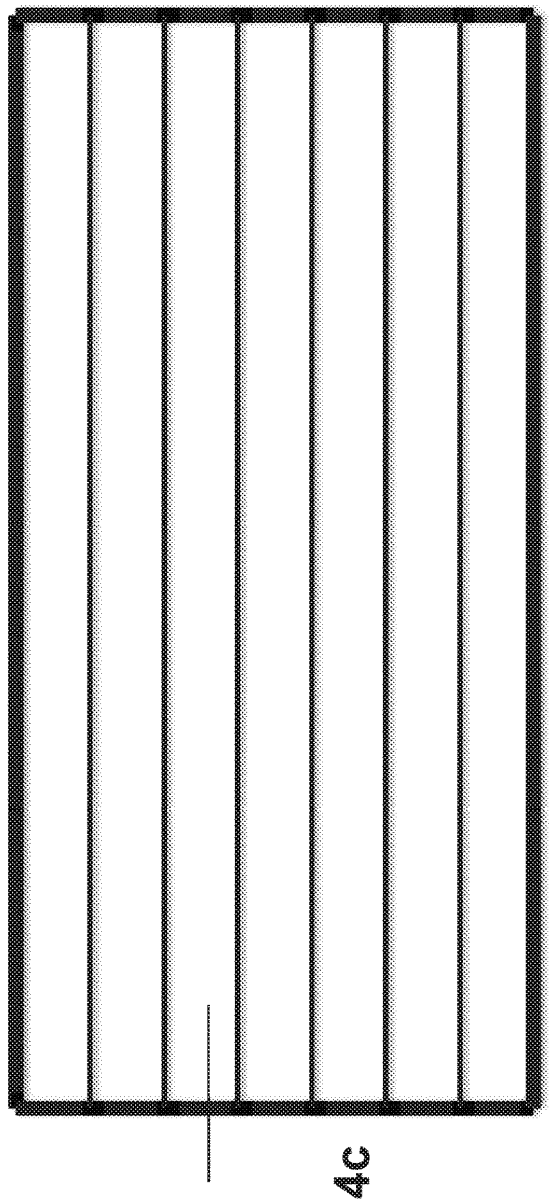
FIG. 4c is a view of the bottom surface of the structure of the present invention.

FIG. 4a shows the backside section 414 of the housing of the present invention. This backside comprises the same material as the sidewall and top sections. This backside section also has edges that are attached to the sidewall sections and top sections of the housing. FIG. 4b shows the front section 410 of the housing structure. This section covers the front opening of the housing through which the vehicle enters and leaves the housing. This opening can have various configurations. In FIG. 4b, the opening comprises a top section 416 and a bottom section 418. A connecting means 420 connects the two sections to completely close the housing. The connecting means could be a zipper that forms a waterproof seal between the two sections. FIG. 4c shows a floor section 422 for this invention. This floor section comprises a similar material to the other parts of the housing. However, this material can have a thicker and denser surface that makes it more durable.

FIG. 5 is a view of the attachment of the side surface and top surface with an air tube. As previously described, in this embodiment shown, the top surface 506 attaches to an air tube 504. The sidewall surface 502 also attaches to the air tube. FIG. 6 highlights the attachment means 620 between the wall or top surface 602 and the air tube 604. In one approach, the wall edge can be fused to the air tubes. FIG. 7 is a side view of the attachment of the edges of the sides and top surface of the present invention. In this embodiment, an adhesive material forms the attachment and seal to join the top edge 722 and the side edge 724. Other options are available to attach the sides, which include the fusion of the edges. An example of another type of product that shows this fusion is an air mattress.

Figure 8:
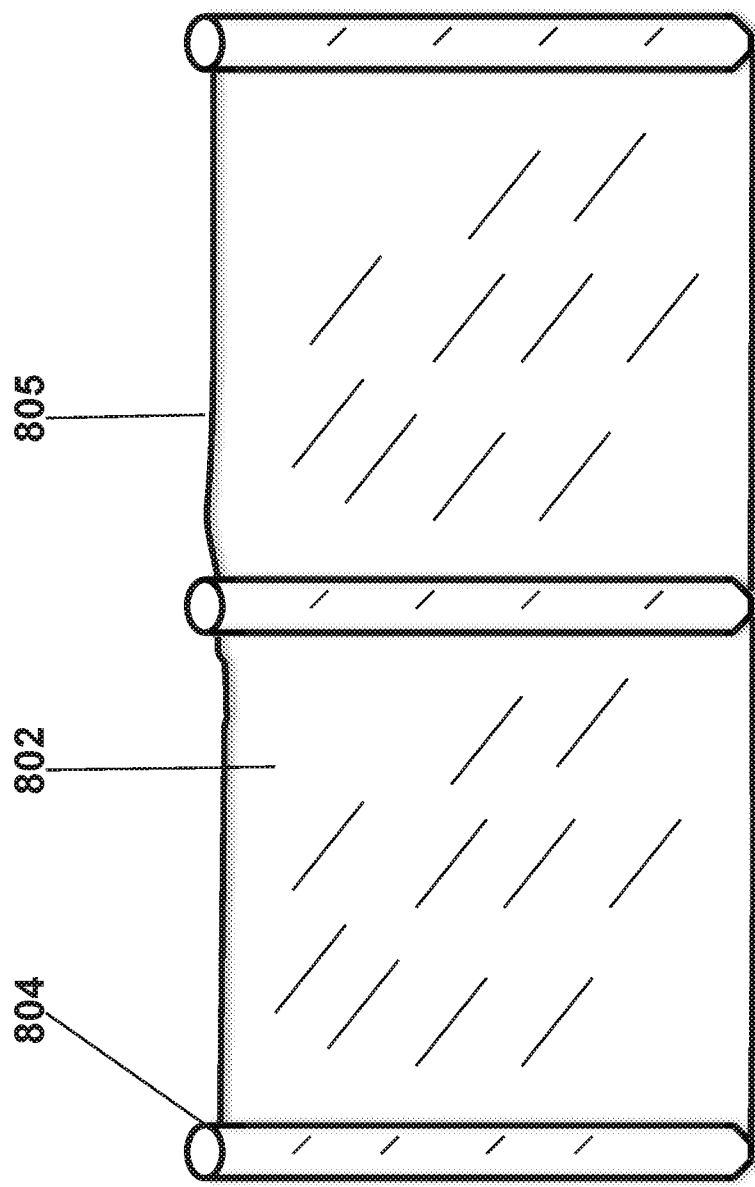
FIG. 8 is a view of the sides and air tubes showing a flexible material of the sides.

FIG. 8 is a view of the sides and air tubes showing a flexible material 802 of the sides. In the implementation of this invention, the material can fold down with the housing is not in use. Also shown is another configuration of the inflatable air tubes. IN this configuration, the air tubes extend up to the edge 805 of the side.

Figure 9:
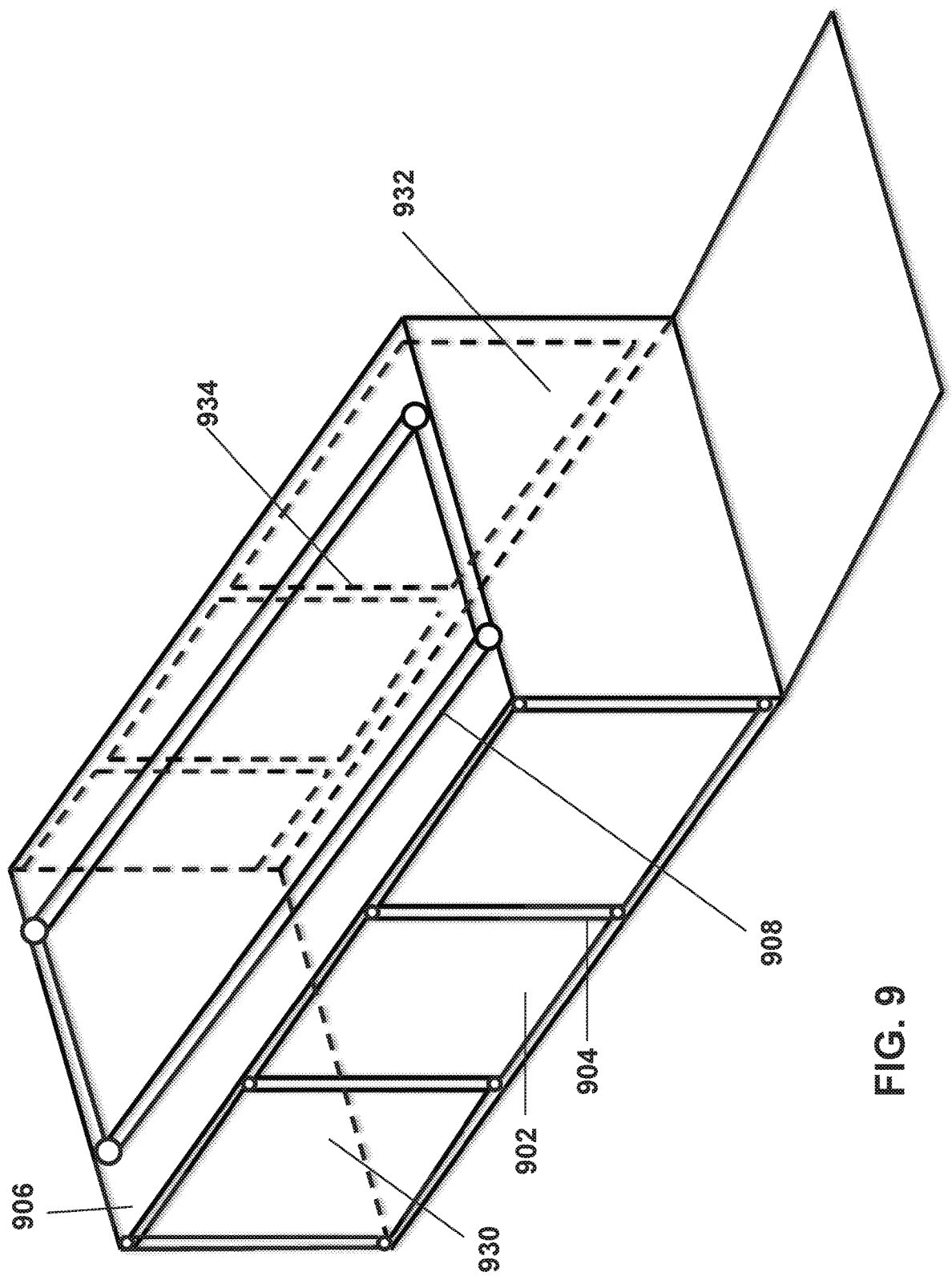
FIG. 9 is a view of an inflated empty structure of the present invention showing the hidden sides and sections.

FIG. 9 is a view of an inflated empty vehicle housing structure of the present invention showing the hidden sides and sections. This view shows the sidewalls 902 and air tube configuration 904 along with the top surface 906 and top air tube configuration 908. The opposite or previously hidden side 932 is similar and symmetrical to side 902. This side 932 should also have the same air tube configuration as side 920. This side also connects to all other sides and floor of the housing in the same manner as side 902.

Figure 10:
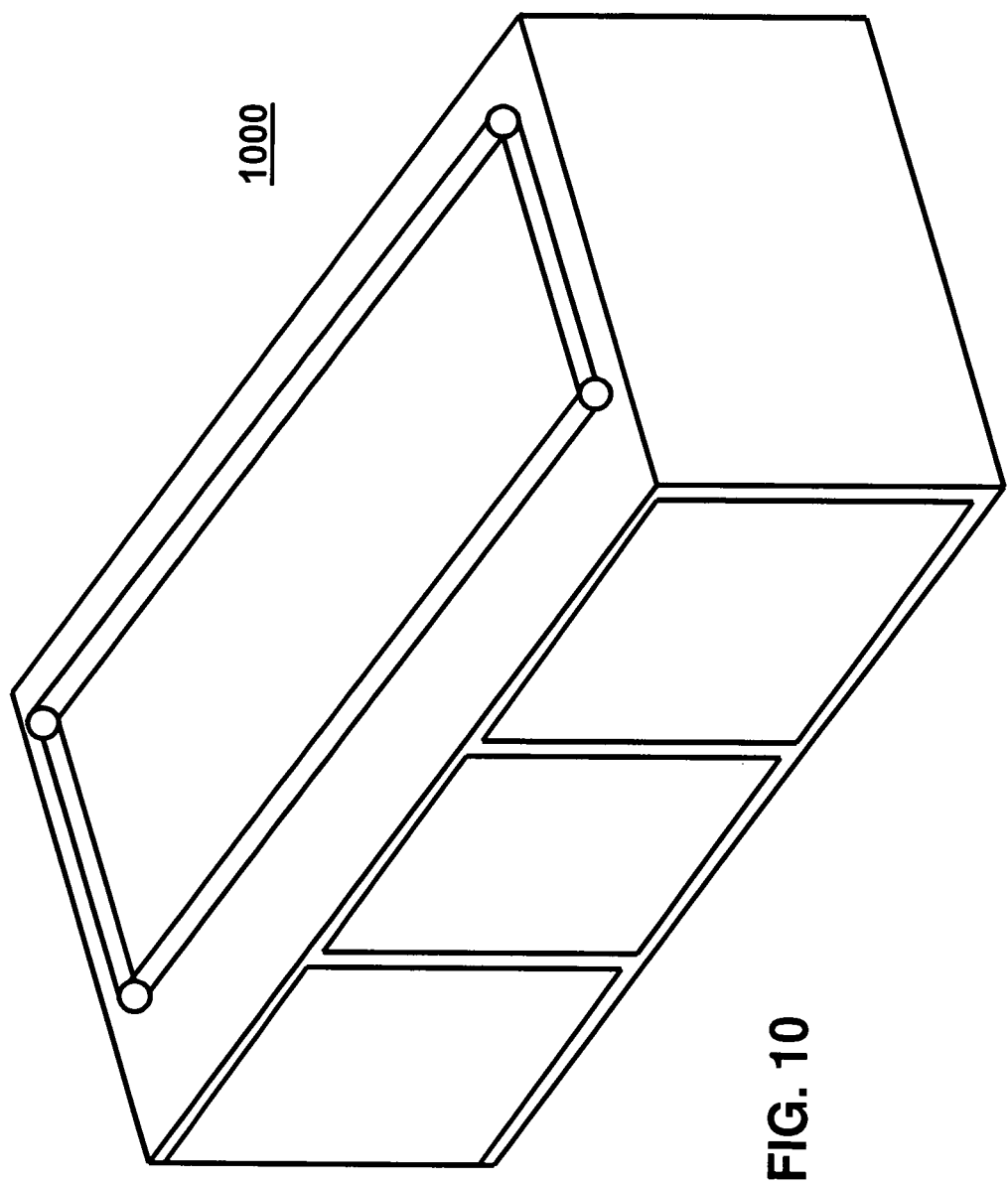
FIG. 10 is a view of an inflated structure of the present invention in a closed position.
Figure 11:
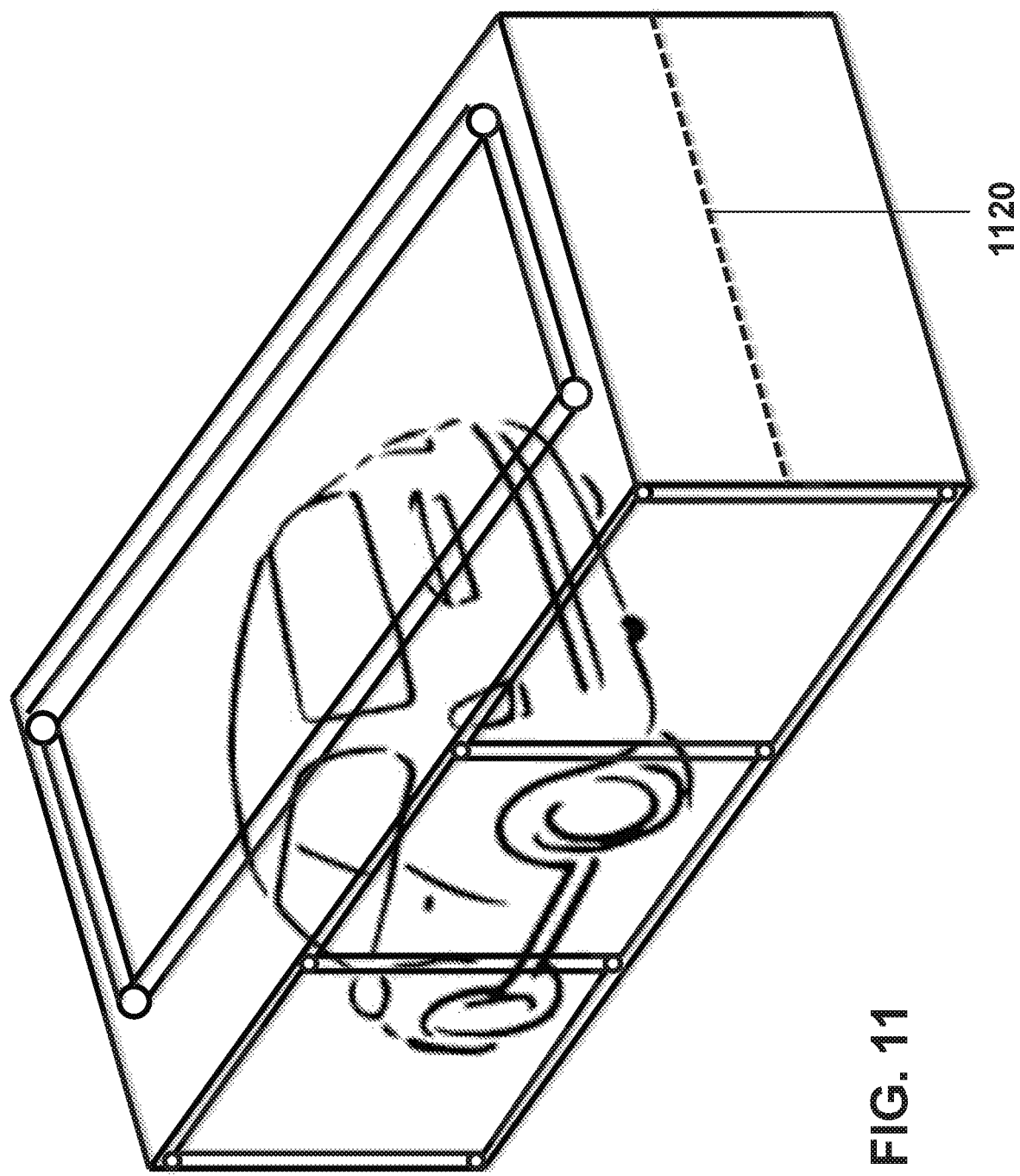
FIG. 11 is a view of an inflated structure of the present invention containing a motor vehicle in a closed position.
Figure 12:
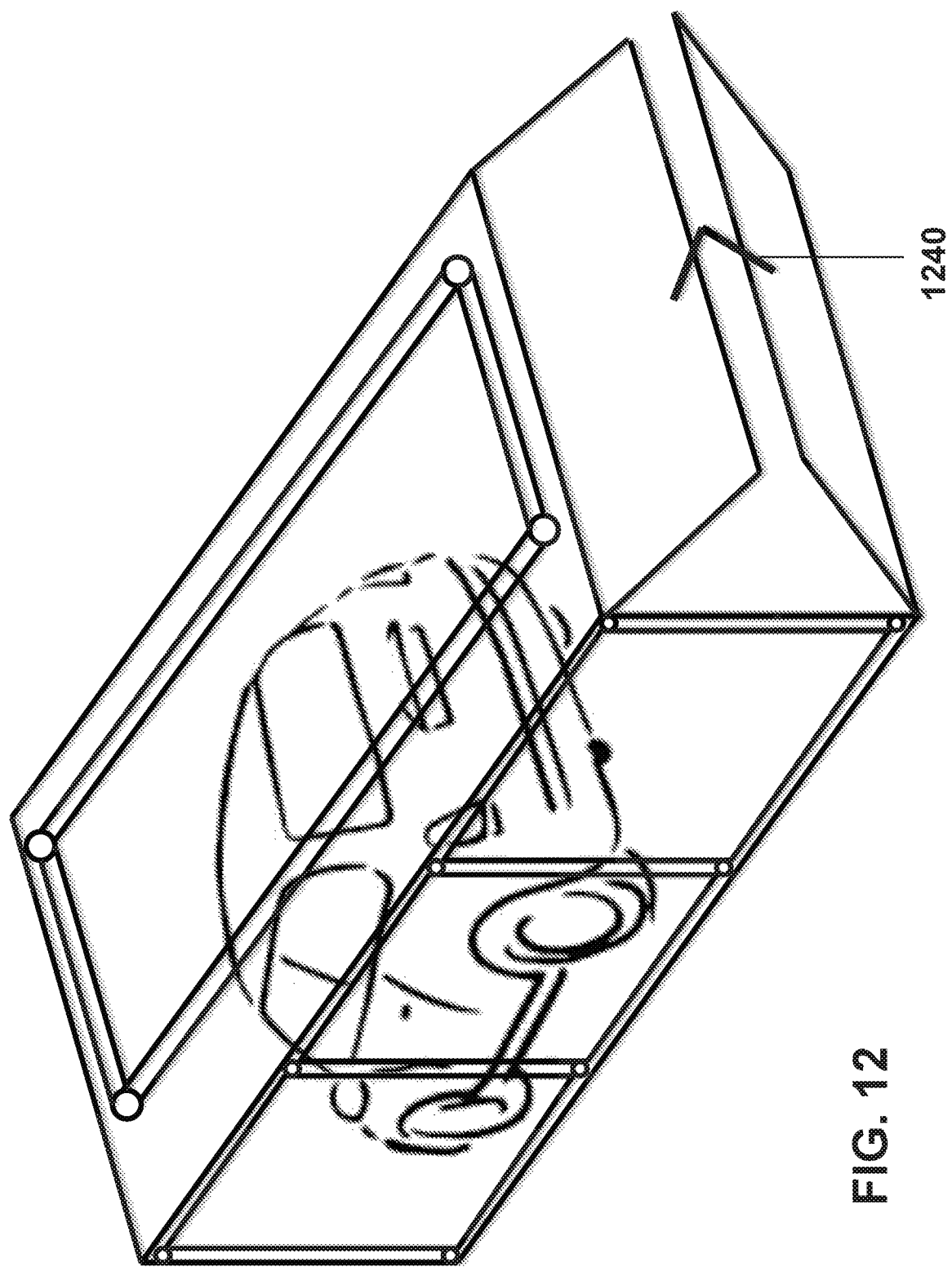
FIG. 12 is a view of an inflated structure of the present invention containing a motor vehicle in an open position.

FIG. 10 is a view of an inflated structure of the present invention in a closed position. In this closed position, the housing invention forms a generally rectangular housing that encloses motor vehicle once inside. The waterproof sides, top and floor and along with the waterproof seals that join the side edges prevents flood water and high water from penetrating the housing flooding the vehicle. FIG. 11 shows the housing of the present invention in the closed position. As shown, when in the closed position, the motor vehicle is contained in the housing. The connector 1120 attaches the top and bottom sections of the front cover to provide the seal for the front section. FIG. 12 shows the housing of the present in a partially open configuration. As shown, this embodiment has a strap 1240 that connects the top and bottom sections of the front end.

Figure 13:
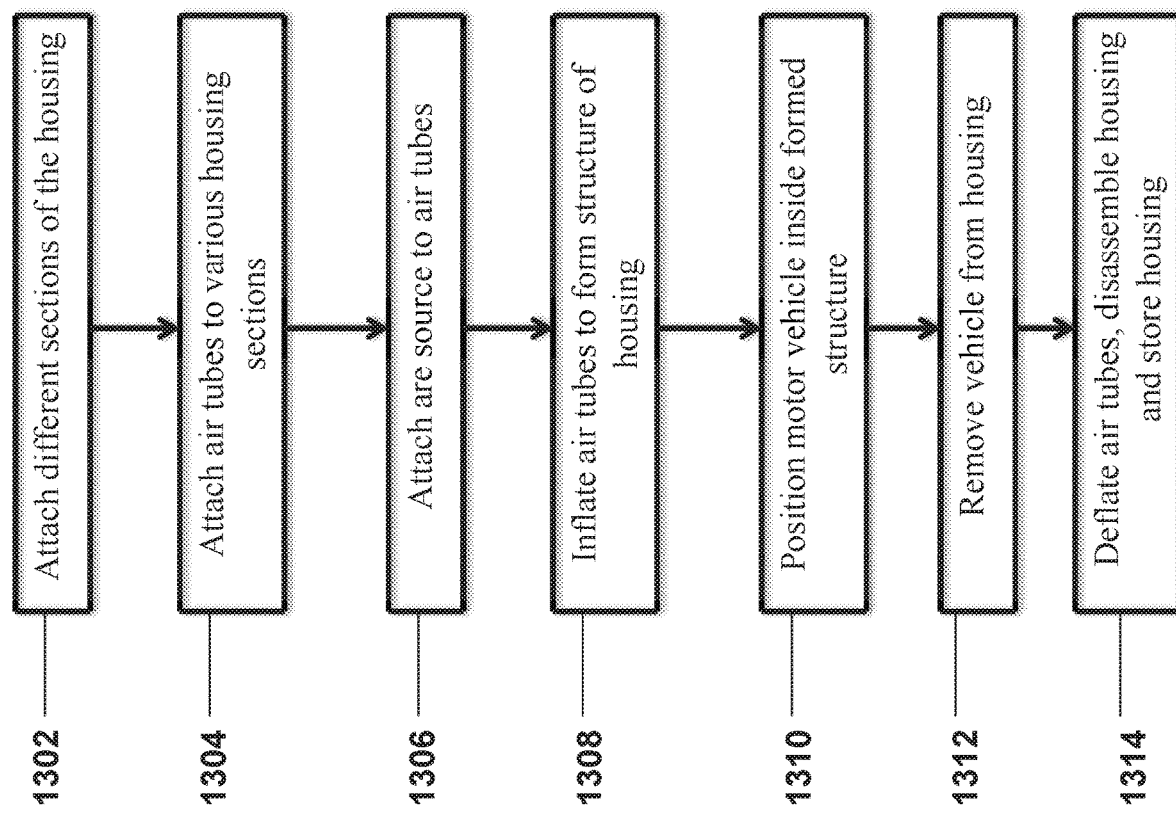
FIG. 13 is a general flow diagram of the method of the present invention.

In another embodiment of the present invention, the air tubes that form the support and structural integrity can be attachable to the sides and top surfaces. In this embodiment, the user would attach the deflated air tubes to a side of the housing and top and then inflate the air tubes. As the tubes fill with air, the tubes expand and take shape. As a result, the attached sides and top take shape to form the housing. The air tubes can be attached to the sides and top on either side of the surface. In one embodiment, the air tubes would be inside the formed housing FIG. 13 shows a general flow diagram of the method of the present invention to construct the housing to protect a vehicle from flooding in a high water environment. In step 1302, the sides, top and bottom are attached to assemble the surfaces of the housing. In this embodiment, the attachment means could be various approaches including a way to snap the edges together similar to sealing a sandwich bag. The edges would grooves that interconnect to form the seal. Also, as with other embodiments, the edges could also be fused together to form the seal. Step 1304 attaches the air tubes to the sides and top of the housing. In this connection step, the air tubes can have connectors that attach to connectors on the surfaces. In step 1306, an air source is attached to the air tubes for air tubing inflating. Step 1308 inflates the air tubes to form the structure of the housing. After the air tubes are completely inflated, the housing will take shape and form the completed structure. Step 1310 then positions the motor vehicle inside the housing. After high water is no longer a threat, step 1312 removes the structure from the housing. In step 1314, the user will deflate the air tubes. The structure will then collapse and the user can disassemble the product and store the product if desired.

In many situations, flood occurs but the entire vehicle is not submerged in water. The damage is flooding situations is primarily when water gets into the engine causing damage to the engine and other internal parts of the vehicle. In addition much of the water that enters the passenger portion of the vehicle enters through the bottom of the vehicle and through the bottom portion of doors. Water may also enter the vehicle through the exhaust pipes in the rear of the vehicle. Another embodiment of this invention comprises a car cover product that semi-encloses an automotive vehicle. This product will enclose the lower portion of the vehicle including the hood section and trunk or storage section. The parts of the vehicle not enclosed would be the top portion of the vehicle. This top portion of the vehicle that will be exposed can include the widows and front and back windshield sections of the vehicle. This embodiment provides another option for covering a vehicle to prevent water entering and/or damaging a vehicle during a flood.

The method and product to prevent flooding of a motor vehicle in high water provides significant advantages over the current art. The invention has been described in connection with its preferred embodiments. However, it is not limited thereto. Changes, variations and modifications to the basic design may be made without departing from the inventive concepts in this invention. In addition, these changes, variations and modifications would be obvious to those skilled in the art having the benefit of the foregoing teachings. All such changes, variations and modifications are intended to be within the scope of this invention.

I claim:

1. A product to prevent damage to and flooding of a motor vehicle in high water comprising:

a housing composed of a flexible water-resistant material configured to enclose and contain the motor vehicle in an enclosed configuration during high water conditions, said flexible water-resistant material further comprising a shape having oppositely facing side sections, a back section removably connecting the two side sections and a top section removably connected to the two side sections and the back section whereby these side, back and top sections define the housing that encloses the motor vehicle, said side, top and back sections of the housing having edges that are attachable, detachable and re-attachable to facilitate efficient disassembly and storage;

a floor surface material attached to said flexible water-resistant material, said floor surface positioned such that the motor vehicle rests on said floor surface material in the enclosed configuration;

air tubes removably attached to one of an inside surface or an outside surface of each said side section and the top section, the air tubes configured to be inflated with air to provide structure and support for the flexible water-resistant material defining the housing that further protects the motor vehicle from physical damage from physical debris, wherein edges of said side, top and back sections of the housing are attached together as part of the housing and said air tubes are detachable and removable from the flexible water-resistant material to facilitate efficient disassembly and storage.

2. The product as described in claim 1 wherein said air tubes form a system of tubes attached to each side section and the top section of the flexible water resistant material forming the housing such that when inflated these air tubes provide support and structural integrity for the housing formed by the side, top, back and front sections of the flexible water resistant material.

3. The product as described in claim 1 wherein said air tubes are individually attached to each side section and the top section of the flexible water resistant material forming the housing such that when inflated these air tubes provide support and structural integrity for the housing formed by the side, top, back and front sections of the flexible water resistant material.

4. The product as described in claim 1 wherein said flexible water resistant material forming a housing further comprises a front side section attached to at least one side section and the top section of said housing and covering an opening formed in the housing by the side and top sections through which the motor vehicle would enter and exit the housing.

5. The product as described in claim 4 wherein said front side section further comprises an upper section and a lower section, the upper section being attached to the top section of the housing and the lower section being attached to the floor surface of the housing.

6. The product as described in claim 5 wherein said upper and lower sections of said front side section are attached and secured to each other with a zipper mechanism such that the attachment of the upper and lower sections is waterproof.

7. The product as described in claim 5 wherein said upper and lower sections of said front side section are attached and secured to each other with an adhesive material such that the attachment of the upper and lower sections is waterproof.

8. A product to prevent damage to and flooding of a motor vehicle in storm and high water comprising:

a housing composed of a flexible water-resistant material configured to enclose and contain the motor vehicle in an enclosed configuration during high water conditions, said flexible water-resistant material further comprising a shape having oppositely facing side sections, a back section removably connecting the two side sections and a top section removably connected to the two side sections and the back section whereby these side, back and top sections define the housing that encloses the motor vehicle, said side, top and back sections of the housing having edges that are attachable, detachable and re-attachable to facilitate efficient disassembly and storage;

a floor surface material attached to said flexible water-resistant material, said floor surface positioned such that the motor vehicle rests on said floor surface material in the enclosed configuration;

air tubes removably attached to one of an inside surface or an outside surface of each said side section and the top section, the air tubes configured to be inflated with air to define a housing structure that will provide support and structural integrity for the flexible water-resistant material defining the housing, wherein edges of said side, top and back sections of the housing are attached together as part of the housing structure, said air tubes are detachable and removable from the flexible water-resistant material to facilitate efficient disassembly and storage, the housing structure configured to provide structural integrity to further provide protection to the motor vehicle from physical damage from flying solid objects and flying physical debris.

9. A method to prevent damage to and flooding of a motor vehicle in storm and high water comprising:

providing the product of claim 1;

assembling the water-resistant housing to enclose the motor vehicle during said high water conditions;

attaching said air tubes to the housing, the air tubes capable of being inflated with air such that when inflated a housing structure is created that will provide support and structural integrity for the material forming the housing;

attaching an air source to the air tubes;

inflating the attached air tubes such that when the air tubes are inflated the housing structure is created that will provide support and structural integrity for the material forming the housing;

removing the air source and sealing an inlet through which air is supplied from the attached air source when air tubes are inflated;

verifying seal integrity of the connected sections forming the housing;

positioning the motor vehicle in the housing;

attaching and sealing a housing segment that seals an opening in the housing through which the motor vehicle is positioned in the housing; and verifying seals of the housing segment that seals the opening in the housing.

10. The method as described in claim 9, further comprising:

removing the motor vehicle positioned in the housing;

deflating air tubes attached to the housing;

disassembling the housing; and storing the housing material.

11. A method to prevent damage to and flooding of a motor vehicle in storm and high water comprising:

providing the product of claim 8;

assembling the water-resistant housing to enclose the motor vehicle during said high water conditions;

attaching said air tubes to the housing, the air tubes capable of being inflated with air such that when inflated the housing structure is created that will provide support and structural integrity for the material forming the housing;

attaching an air source to the air tubes;

inflating the attached air tubes such that when the air tubes are inflated the housing structure is created that will provide support and structural integrity for the material forming the housing;

removing the air source and sealing an inlet through which air is supplied from the attached air source when air tubes are inflated;

verifying seal integrity of the connected sections forming the housing;

positioning the motor vehicle in the housing;

attaching and sealing a housing segment that seals an opening in the housing through which the motor vehicle is positioned in the housing; and verifying seals of the housing segment that seals the opening in the housing.

12. The method as described in claim 11, further comprising:

removing the motor vehicle positioned in the housing;

deflating air tubes attached to the housing;

disassembling the housing; and storing the housing material.

\* \* \* \* \*